(12) United States Patent
Tamaru et al.

(10) Patent No.: US 11,909,212 B2
(45) Date of Patent: Feb. 20, 2024

(54) HYDROGEN-SYSTEM CONTROL DEVICE AND HYDROGEN-SYSTEM CONTROLLING METHOD

(71) Applicant: TOSHIBA ENERGY SYSTEMS & SOLUTIONS CORPORATION, Kawasaki (JP)

(72) Inventors: Shingo Tamaru, Kawasaki Kanagawa (JP); Takashi Akiba, Kawasaki Kanagawa (JP); Fumiyuki Yamane, Kawasaki Kanagawa (JP); Shin Kato, Yokohama Kanagawa (JP)

(73) Assignee: Toshiba Energy Systems & Solutions Corporation, Kawasaki (JP)

( * ) Notice: Subject to any disclaimer, the term of this patent is extended or adjusted under 35 U.S.C. 154(b) by 435 days.

(21) Appl. No.: 17/345,891

(22) Filed: Jun. 11, 2021

(65) Prior Publication Data

US 2021/0359519 A1 Nov. 18, 2021

Related U.S. Application Data

(63) Continuation of application No. PCT/JP2018/045626, filed on Dec. 12, 2018.

(51) Int. Cl.
*H02J 15/00* (2006.01)
*H02J 3/28* (2006.01)
(Continued)

(52) U.S. Cl.
CPC .............. *H02J 3/28* (2013.01); *G05B 13/026* (2013.01); *H02J 3/144* (2020.01); *H02J 3/381* (2013.01);
(Continued)

(58) Field of Classification Search
CPC .... H02J 3/28; H02J 3/144; H02J 3/381; H02J 15/008; G05B 13/026; G06Q 10/06313; G06Q 10/06315
See application file for complete search history.

(56) References Cited

U.S. PATENT DOCUMENTS 9,541,067 B2 1/2017 De Boer
10,374,433 B2 8/2019 Ito
(Continued)

FOREIGN PATENT DOCUMENTS

JP 2006-1797 A 1/2006
JP 2015-500439 A 1/2015
(Continued)

OTHER PUBLICATIONS

M. Ban et al., "Integration of power-to-hydrogen in day-ahead security-constrained unit commitment with high wind penetration," J. Mod. Power Syst. Clean Energy, 5(3):337-349 (2017).
(Continued)

*Primary Examiner* — Michael W Choi
(74) *Attorney, Agent, or Firm* — Finnegan, Henderson, Farabow, Garrett & Dunner, LLP (57) ABSTRACT

A hydrogen-system control device according to the present embodiment is a hydrogen-system control device that controls a hydrogen system. The hydrogen-system control device includes an acquirer configured to acquire a predicted value of the first power for a time period for which an amount of the second power to be received has been set, and a controller configured to cause the hydrogen system to additionally produce hydrogen in an amount corresponding to a usage ratio of surplus power by which a supplied value of the first power exceeds the predicted value of the first power, wherein the controller sets the usage ratio for a first time period within a predetermined time period to a value larger than the usage ratio for a second time period that is
(Continued)

after the first time period and within the predetermined time period.

12 Claims, 10 Drawing Sheets

(51) Int. Cl.
  *G05B 13/02* (2006.01)
  *H02J 3/38* (2006.01)
  *H02J 3/14* (2006.01)
  *G06Q 10/0631* (2023.01)

(52) U.S. Cl.
  CPC ...... *H02J 15/008* (2020.01); *G06Q 10/06313* (2013.01); *G06Q 10/06315* (2013.01)

(56) References Cited

U.S. PATENT DOCUMENTS

| | | |
|---|---|---|
| 2017/0161849 A1 | 6/2017 | Seki et al. |
| 2020/0119421 A1* | 4/2020 | Kim ........................ C25B 13/08 |

FOREIGN PATENT DOCUMENTS

| | | |
|---|---|---|
| JP | 2016-111871 A | 6/2016 |
| JP | 6005034 B2 | 10/2016 |
| JP | 6030158 B2 | 11/2016 |
| JP | 6038085 B2 | 12/2016 |
| JP | 2017-34843 A | 2/2017 |
| JP | 6189448 B2 | 8/2017 |

OTHER PUBLICATIONS

X. Wang et al., "Optimal scheduling of demand responsive industrial production with hybrid renewable energy systems," Renewable Energy, vol. 100, pp. 53-64 (2017).

* cited by examiner

HYDROGEN-SYSTEM CONTROL DEVICE AND HYDROGEN-SYSTEM CONTROLLING METHOD

CROSS-REFERENCE TO RELATED APPLICATIONS

This application is a continuation application of International Application No. PCT/JP2018/045626, filed Dec. 12, 2018. The contents of this application is incorporated herein by reference in their entirety.

FIELD

Embodiments of the present invention relate to a hydrogen-system control device and a hydrogen-system controlling method.

BACKGROUND

There has been generally known a hydrogen system that produces hydrogen using power supplied from a power grid and power that has been generated by a renewable energy system and fluctuates more than that of the power grid. The hydrogen system produces hydrogen in an amount satisfying demands for hydrogen while adjusting balance between supply of and demands for power supplied from the power grid. Therefore, a target value of the amount of hydrogen to be produced is set using a predicted value of power to be generated by the renewable energy system.

On the other hand, when the renewable energy system generates power in an amount larger than a predicted value of power to be generated, it is possible to execute control to increase the usage of power generated by the renewable energy system by producing hydrogen in an amount exceeding a planned value. However, there is a problem that control response of a hydrogen production device generally becomes slower than control of the renewable energy system.

An object to be solved by the present invention is to provide a hydrogen-system control device and a hydrogen-system controlling method that can use and adjust power generated by a renewable energy system.

DETAILED DESCRIPTION

A hydrogen-system control device according to the present embodiment is a hydrogen-system control device that controls a hydrogen system that produces hydrogen using first power generated by a renewable energy system and second power supplied from a power grid, the device comprising: an acquirer configured to acquire a predicted value of the first power for a time period for which an amount of the second power to be received has been set; and a controller configured to cause the hydrogen system to additionally produce hydrogen in an amount corresponding to a usage ratio of surplus power by which a supplied value of the first power exceeds the predicted value of the first power, wherein the controller sets the usage ratio for a first time period within the time period to a value larger than the usage ratio for a second time period that is after the first time period and within the time period.

According to the present embodiment, it is possible to use and adjust power generated by a renewable energy system.

A hydrogen-system control device, a hydrogen-system controlling method, and a hydrogen production system according to embodiments of the present invention will now be explained in detail with reference to the accompanying drawings. The embodiments described below are only examples of the embodiments of the present invention and it is not to be understood that the present invention is limited to these embodiments. In the drawings referred to in the embodiments, same parts or parts having identical functions are denoted by like or similar reference characters and there is a case where redundant explanations thereof are omitted. Further, for convenience of explanation, there are cases where dimensional ratios of the parts in the drawings are different from those of actual products and some part of configurations is omitted from the drawings.

First Embodiment

Figure 1:
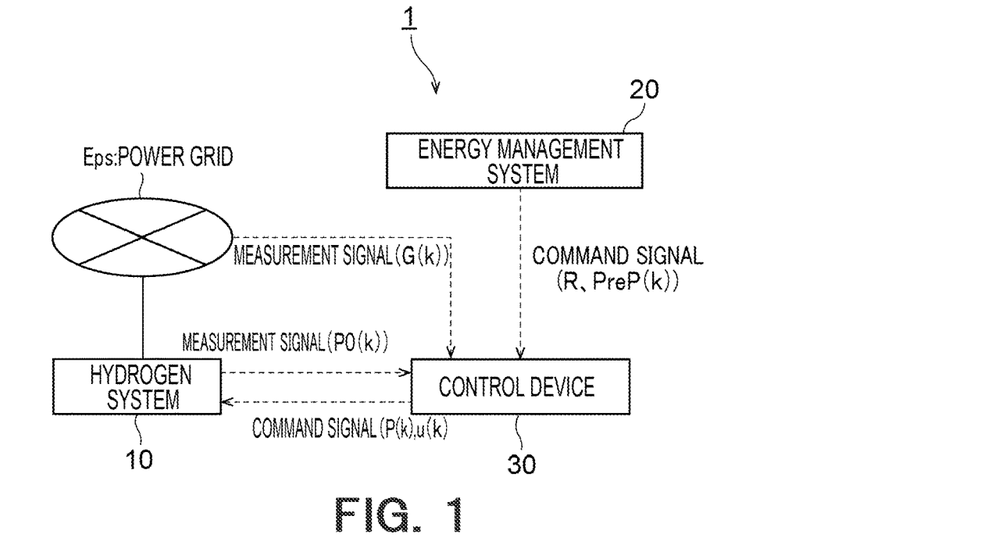
FIG. 1 is a block diagram illustrating a configuration of a hydrogen production system.

FIG. 1 is a block diagram illustrating a configuration of a hydrogen production system 1 according to a first embodiment. As illustrated in FIG. 1, the hydrogen production system 1 according to the first embodiment is a system that produces hydrogen and includes a hydrogen system 10, an energy management system 20, and a control device 30. FIG. 1 further illustrates a power grid Eps.

The hydrogen system 10 produces hydrogen using first power $P0(k)$ generated by a renewable energy system within the hydrogen system 10 and second power $G(k)$ supplied from the power grid Eps. The hydrogen system 10 outputs a measurement signal including information of the first power $P0(k)$ to the control device 30. In this case, k indicates a time.

The energy management system 20 outputs, to the control device 30, a command signal including information of predicted power PreP(k) to be generated by the renewable energy system and a target received energy R to be received for a predetermined time period. The predetermined time period for which the target amount R of second power G(k) to be received from the power grid Eps is set corresponds to a so-called "demand response time period". The target received energy R to be received is set for the demand response time period based on, for example, an agreement with a power company. Therefore, when power in an amount exceeding the target received energy R to be received for the demand response time period is received from the power grid Eps, an electric power fee higher than usual is charged for received power in an amount exceeding the target received energy R to be received as a penalty, for example. The demand response time period is in units of 30 minutes and is in a range of 30 to 120 minutes, for example. The demand response time period is set in a time zone in which a large electric energy is demanded, for example. On the other hand, when the amount of received power is smaller than the target received energy R to be received, a penalty is not imposed but the amount of hydrogen to be produced needs to be closer to a planned value and it is difficult to simply reduce the received energy.

The control device 30 outputs, to the hydrogen system 10, a command signal including information of power u(k) for production by the hydrogen system 10 and output power P(k) of a power conditioner based on a measurement signal including information of first power P0(k) and supplied from the hydrogen system 10, a measurement signal including information of power G(k) received from the power grid Eps, and a command signal supplied from the energy management system 20 and including information of the target received energy R to be received and predicted power PreP(k) to be generated. That is, the control device 30 controls power u(k) for production by the hydrogen system 10 and output power P(k) of the power conditioner based on a measurement signal including information of first power P0(k) and supplied from the hydrogen system 10, a measurement signal including information of power G(k) received from the power grid Eps, and a command signal supplied from the energy management system 20 and including information of the target received energy R to be received and predicted power PreP(k) to be generated.

The power grid Eps is a power grid managed by a power company, for example.

Figure 2:
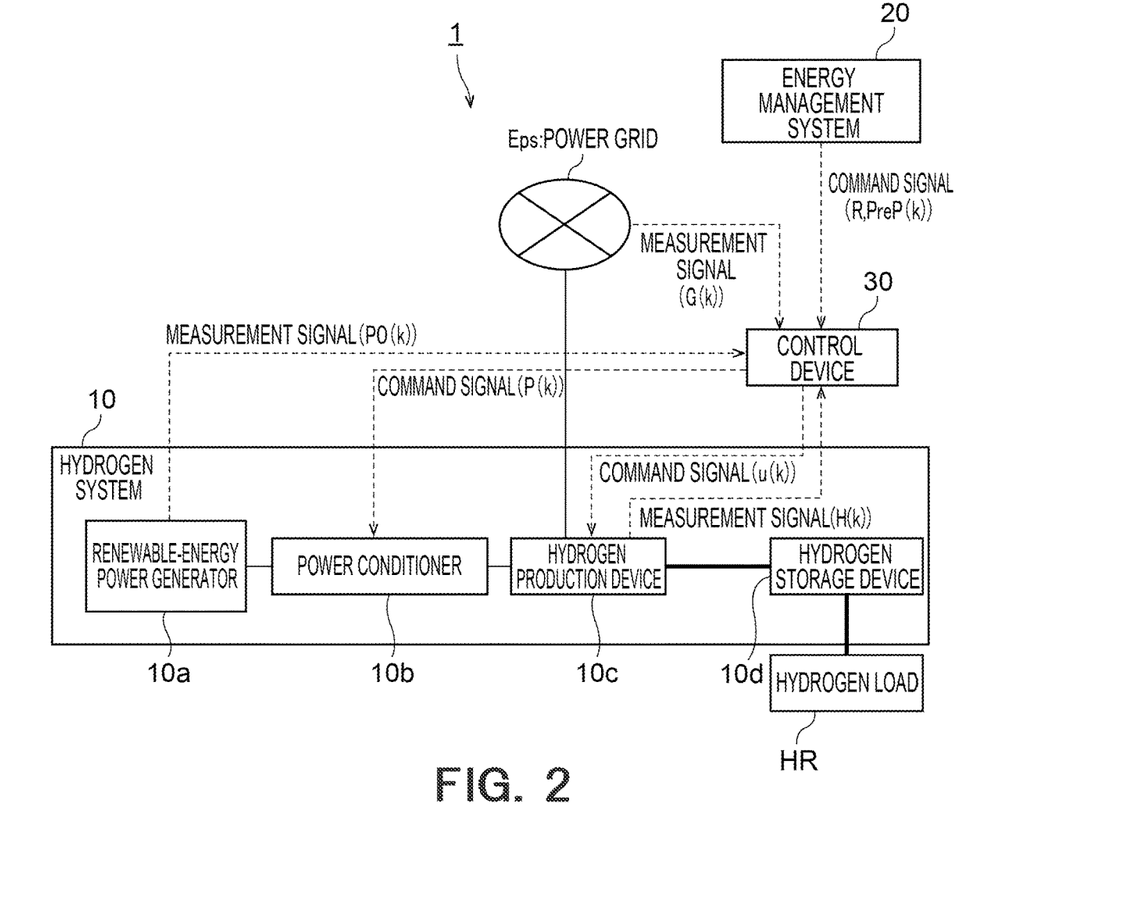
FIG. 2 is a block diagram illustrating a configuration of a hydrogen system.

FIG. 2 is a block diagram illustrating a configuration of the hydrogen system 10. As illustrated in FIG. 2, the hydrogen system 10 includes a renewable energy system 10a, a power conditioner 10b, a hydrogen production device 10c, and a hydrogen storage device 10d. FIG. 2 further illustrates a hydrogen load HR.

As described above, the energy management system 20 outputs, to the control device 30, a command signal including information of the target received energy R to be received from the power grid Eps for a demand response time period and predicted power PreP(k) to be generated by the renewable energy system 10a. The predicted power PreP(k) to be generated is an alternating-current power value obtained by converting power to be generated by the renewable energy system 10a into alternating-current power. The present embodiment describes the alternating-current power value as a reference value, but it is not limited thereto. A direct-current power value may be used as the reference value. For example, the predicted power PreP(k) to be generated according to the present embodiment is an alternating-current power value, but it is not limited thereto and the predicted power PreP(k) may be a direct-current power value. Further, a value obtained by dividing the target received energy R to be received by a demand response time period is target power r(k) to be received.

The renewable energy system 10a includes a power generator that uses naturally derived energy. The power generator that uses naturally derived energy is, for example, a photovoltaic generation device (PV) that uses sunlight. The renewable energy system 10a outputs, to the control device 30, a measurement signal including information of first power P0(k) that is an alternating-current power value of generated power PW(k). That is, the first power P0(k) is the alternating-current power value of the generated power PW(k).

The renewable energy system 10a does not require a fuel such as a fossil fuel; however, the electric energy to be generated thereby is affected by an environment such as the weather and is unstable. The renewable energy system 10a may be a wind power generator or a power generator that uses new energy such as biomass or waste derived from biomass.

The power conditioner 10b includes a converter, for example. The converter converts generated power PW(k) output by the renewable energy system 10a into predetermined output power P(k). Specifically, the power conditioner 10b supplies, to the hydrogen production device 10c, output power P(k) obtained by adjusting the amount of the generated power PW(k) in accordance with a command signal including information of the output power P(k) and input from the control device 30. That is, the amount of the output power P(k) to be output by the power conditioner 10b is adjusted to an amount not larger than the first power P0(k).

The hydrogen production device 10c produces hydrogen from electricity and water by water splitting. The hydrogen production device 10c is, for example, an electric water splitting device that produces hydrogen and oxygen by causing a current to flow in an alkaline solution. The hydrogen production device 10c causes an amount H(k) of produced hydrogen to be stored in the hydrogen storage device 10d through a hydrogen pipe.

The hydrogen production device 10c produces hydrogen in an amount H(k) corresponding to power u(k) for production in accordance with a command signal including information of the power u(k) for production and input from the control device 30. The power u(k) for production has a relationship of Equation (1). The hydrogen production device 10c supplies, to the control device 30, a measurement signal including information of the amount H(k) of the produced hydrogen.

$$G(k)=u(k)-P(k) \qquad \text{Equation (1)}$$

As described above, second power G(k) is power received from the power grid Eps, and output power P(k) is alternating-current power obtained by adjusting, by the power conditioner 10b, the amount of first power P0(k) that is power generated by the renewable energy system 10a. A transformer of the power grid Eps supplies second power G(k) to the hydrogen production device 10c. That is, when the second power G(k) matches target power r(k) to be received on average, an integrated value of the second power G(k) in a demand response time period for the second power G(k) matches the target received energy R to be received.

The control response time of the hydrogen production device 10c is longer than the control response of the renewable energy system 10a and the control response of the power conditioner 10b. For example, a delay in the control response of the hydrogen production device 10c is longer than that of a storage battery in general, and an amount of change in the control response of the hydrogen production device 10c in each control cycle is smaller than that of a storage battery in general. Therefore, when first power P0(k) of the renewable energy system 10a increases and power u(k) for production by the hydrogen production device 10c is increased, the response is delayed. Accordingly, when the amount of hydrogen to be produced by the hydrogen production device 10c is increased, first power P0(k) that is power generated by the renewable energy system 10a may decrease in amount and output power P(k) of the renewable energy system 10a may decrease in amount. In this case, this causes an increase in the amount of second power G(k) received from the power grid Eps and excess of second power G(k) over target power r(k) to be received as expressed by Equation (1). Power that is generated due to a delay in response and causes an increase in second power G(k) is referred to as "positive response delay power". Particularly, when positive response delay power is generated immediately before the end of a demand response time period, it is difficult to adjust the amount of second power G(k) to be integrated in the demand response time period and there is a possibility that demand response may fail.

Similarly, even when first power P0(k) of the renewable energy system 10a decreases and power u(k) for production by the hydrogen production device 10c is reduced, the response is delayed. Therefore, when the amount of hydrogen to be produced by the hydrogen production device 10c is reduced, output power P(k) of the power conditioner 10b may increase in amount. In this case, this causes second power G(k) received from the power grid Eps to decrease to a level lower than target power r(k) to be received as expressed by Equation (1). Power that is generated due to a delay in response and causes a decrease in second power G(k) is referred to as "negative response delay power". Even when the integrated amount of second power G(k) is smaller than the target received energy R to be received, a penalty is not imposed for demand response according to the present embodiment.

The hydrogen storage device 10d stores therein hydrogen produced by the hydrogen production device 10c. The hydrogen storage device 10d is connected to the hydrogen production device 10c and the hydrogen load HR through a pipe. The hydrogen storage device 10d supplies hydrogen to the hydrogen load HR through the pipe. The hydrogen load HR is, for example, a fuel-cell generator or a fuel-cell vehicle. The renewable energy system 10a and the power conditioner 10b may be arranged outside the hydrogen system 10. That is, the hydrogen system 10 may not include the renewable energy system 10a and the power conditioner 10b.

Figure 3:
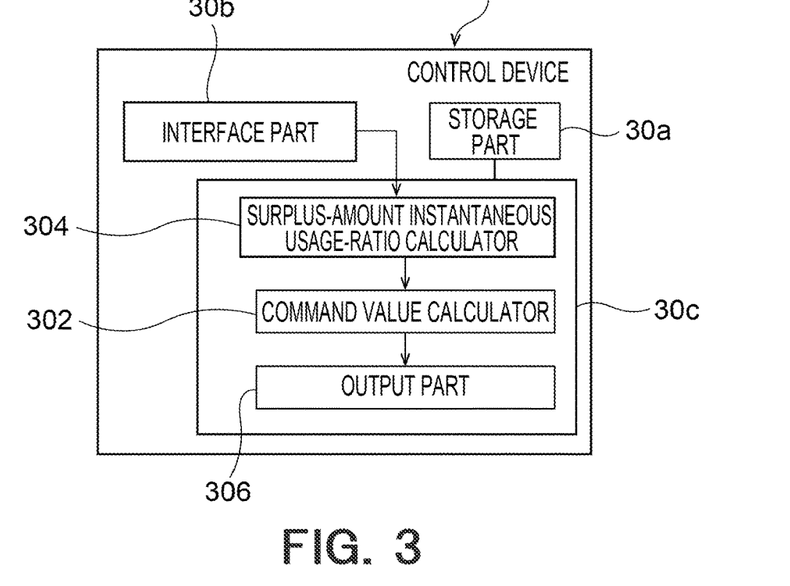
FIG. 3 is a block diagram illustrating a configuration of a control device.

FIG. 3 is a block diagram illustrating a configuration of the control device 30. As illustrated in FIG. 3, the control device 30 includes a storage part 30a, an interface part 30b, and a controller 30c.

The storage part 30a is realized by, for example, a RAM (Random Access Memory), a semiconductor memory element such as a flash memory, a hard disk, or the like. The storage part 30a stores therein a program to be executed by the controller 30c and various control data.

The interface part 30b communicates with the renewable energy system 10a (FIG. 2), the hydrogen production device 10c (FIG. 2), the hydrogen storage device 10d (FIG. 2), and the energy management system 20 (FIG. 2). Therefore, the interface part 30b acquires predicted power PreP(k) to be generated that is a predicted value of first power P0(k) for a time period for which the target received energy R to be received has been set.

The start time and end time of a control time period such as a demand response time period are referred to as "start time of a time zone" and "end time of a time zone", respectively. For example, in each of control time periods, the interface part 30b receives a command signal including information of predicted power PreP(k) to be generated, the target received energy R to be received, a confidence interval of a PV generated energy, and the like, and a measure signal including information of first power P0(k) and the amount H(k) of produced hydrogen. The confidence interval of the PV generated energy is information indicating a probability distribution of an integrated value of predicted power PreP(k) to be generated. For example, the probability distribution is represented by a normal distribution of a standard deviation 6. The interface part 30b according to the present embodiment corresponds to an acquirer.

The controller 30c includes, for example, a CPU (Central Processing Unit) and executes control based on the program stored in the storage part 30a. The controller 30c includes a command value calculator 302, a surplus-amount instantaneous usage-ratio calculator 304, and an output part 306.

Figure 4:
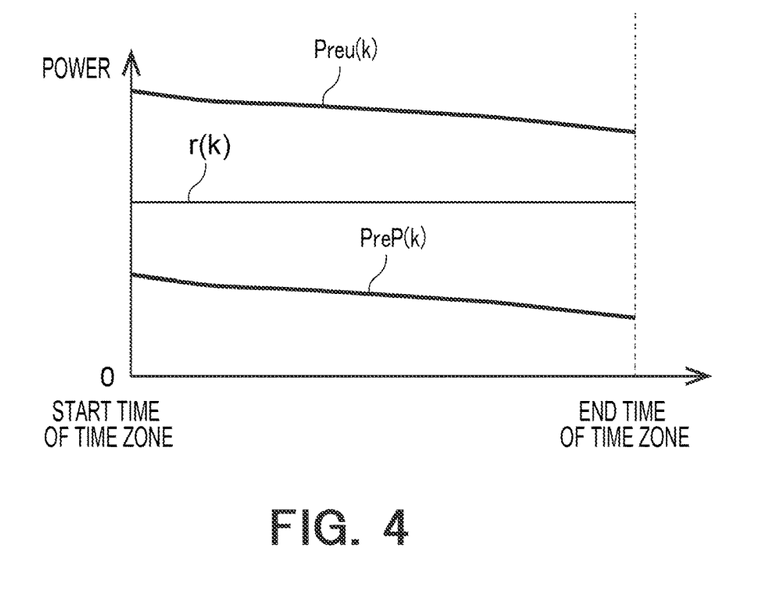
FIG. 4 is a diagram conceptually explaining predicted power to be generated according to the present embodiment.

FIG. 4 is a diagram conceptually explaining predicted power Preu(k) to be generated according to the present embodiment. The vertical axis indicates power and the horizontal axis indicates a time in a demand response time period. As illustrated in FIG. 4, the predicted power Preu(k) to be generated according to the present embodiment is expressed by Equation (2).

$$\mathrm{Pre}u(k)=r(k)+\mathrm{Pre}P(k) \qquad \text{Equation (2)}$$

The command value calculator 302 calculates command values for output power P(k) of the power conditioner 10b, power u(k) for production by the hydrogen production device 10c, and the like. The command value calculator 302 is described later in detail.

The surplus-amount instantaneous usage-ratio calculator 304 calculates a usage ratio RATIO of surplus power Sp(k) to be used for hydrogen production by the hydrogen production device 10C. The surplus power Sp(k) can be expressed by Equation (3). The surplus-amount instantaneous usage-ratio calculator 304 is described later in detail. The surplus-amount instantaneous usage-ratio calculator 304 according to the present embodiment corresponds to a usage calculator.

[Expression 1]

$$Sp(k)=P0(k)-\mathrm{Pre}P(k) \qquad \text{Equation (3)}$$

The output part 306 outputs a command signal including the values calculated by the command value calculator 302. That is, the output part 306 outputs a command signal including output power P(k) to the power conditioner 10b and outputs a command signal including power u(k) for production to the hydrogen production device 10c.

Figure 5:
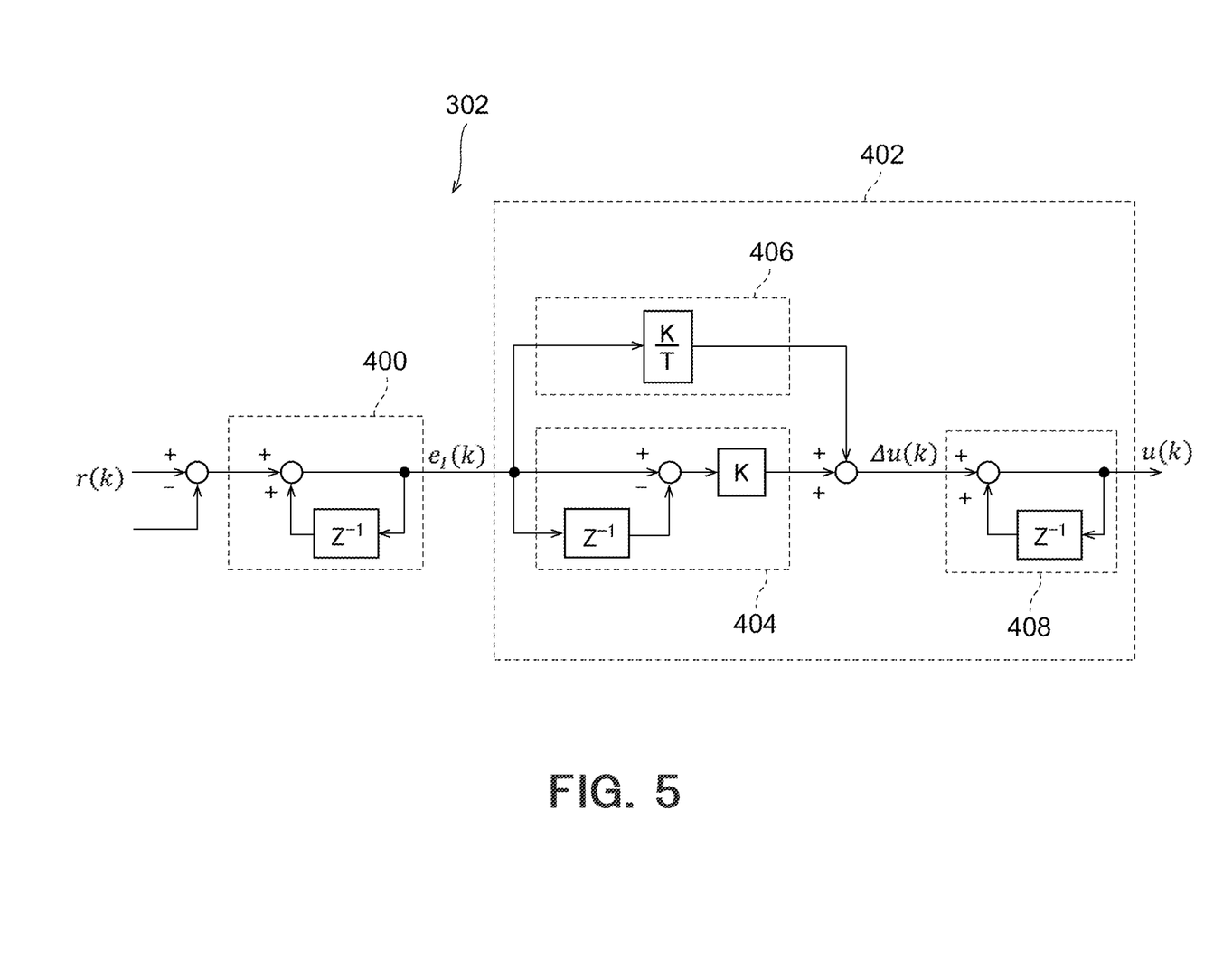
FIG. 5 is a control block diagram illustrating a configuration example of a command value calculator.

FIG. 5 is a control block diagram illustrating a configuration example of the command value calculator 302. The command value calculator 302 is described in detail with reference to FIG. 5. As illustrated in FIG. 5, the command value calculator 302 is a feedback controller that calculates a value of power u(k) for production in such a manner that a difference value between target power r(k) to be received and second power G(k) is reduced. That is, the command value calculator 302 includes an integrator 400 and a PI controller 402. The PI controller 402 includes a P controller 404, an I controller 406, and an adder 408.

The integrator 400 calculates an integrated error $e_I(k)$ of a received power amount according to Equation (4). That is, the integrator 400 sums differences between target power $r(k)$ to be received and second power $G(k)$ at each time k. N corresponds to a time within demand response.
[Expression 2]

$$e_I(k) = \Sigma_{k=1}^N (r(k) - G(k)) \qquad \text{Equation (4)}$$

The P controller 404 performs a proportional operation on $e_I(k)$. The I controller 406 performs an integration operation on $e_I(k)$. Therefore, a value obtained by adding an output value of the P controller 404 to an output value of the I controller 406 is indicated by $\Delta u(k)$ expressed by Equation (5), where K is a proportional gain and $T_I$ is an integration time period.

[Expression 3]

$$\Delta u(k) = K\{e_I(k) - e_I(k-1)\} + \frac{1}{T_I} e_I(k) \qquad \text{Equation (5)}$$

Subsequently, the adder 408 performs addition expressed by Equation (6) and outputs power $u(k)$ for production as feedback controller output of the command value calculator 302 at a time k.
[Expression 4]

$$u(k) = u(k-1) + \Delta u(k) \qquad \text{Equation (6)}$$

Figure 6:
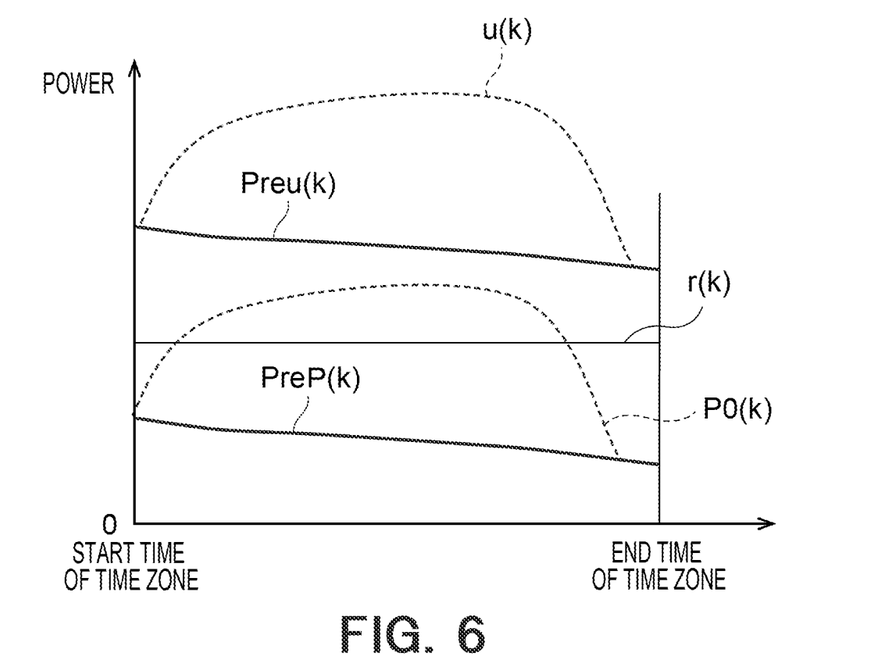
FIG. 6 is a diagram conceptually illustrating power for production that is calculated by the command value calculator.

FIG. 6 is a diagram conceptually illustrating power $u(k)$ for production that is calculated by the command value calculator 302. As illustrated in FIG. 6, in a demand response time period, the command value calculator 302 calculates a value of the power $u(k)$ for production in such a manner that a difference value between target power $r(k)$ to be received and second power $G(k)$ is reduced. In other words, the command value calculator 302 calculates power $u(k)$ for production in such a manner that a difference between power $u(k)$ for production and first power $P0(k)$ matches target power $r(k)$ to be received.

Further, the surplus power $Sp(k)$ expressed by Equation (3) using $u(k)$ expressed by Equation (6) can be expressed by Equation (7).
[Expression 5]

$$Sp(k) \approx u(k) - \text{Pre}u(k) = u(k) - r(k) - \text{Pre}P(k) \qquad \text{Equation (7)}$$

As described above, when all surplus power $Sp(k)$ is used by the hydrogen production device 10c (FIG. 2), received power may exceed the target received energy R to be received due to a delay in the control response. Therefore, a command signal that is output to the hydrogen production device 10c (FIG. 2) in a demand response time period includes information of power $u'(k)$ for production that is expressed by Equation (8) instead of power $u(k)$ for production. The usage ratio RATIO according to the present embodiment is, for example, in a range of 1.0 to 0.
[Expression 6]

$$u'(k) = \text{Pre}u(k) + Sp(k) \times \text{ratio} \qquad \text{Equation (8)}$$

Similarly, a command signal that is output to the power conditioner 10b in a demand response time period includes information of $p'(k)$ expressed by Equation (9) instead of the output power $P(k)$.
[Expression 7]

$$p'(k) = \text{Pre}P(k) + Sp(k) \times \text{ratio} \qquad \text{Equation (9)}$$

Figure 7:
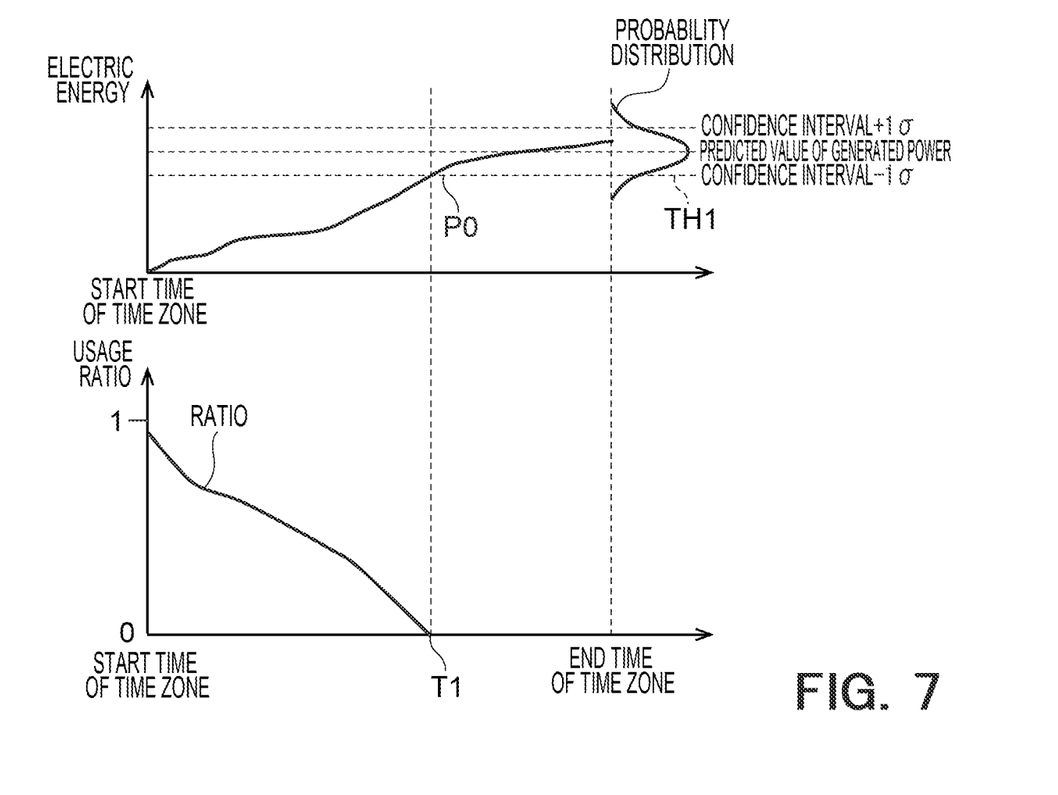
FIG. 7 is a diagram illustrating an example of a method for setting a usage ratio.

FIG. 7 is a diagram illustrating an example of a method for setting a usage ratio RATIO. A configuration of the surplus-amount instantaneous usage-ratio calculator 304 is described in detail with reference to FIG. 7. The upper diagram of FIG. 7 illustrates an integrated amount of first power $P0(k)$ of the renewable energy system 10a (FIG. 2). The lower diagram of FIG. 7 illustrates the value of the usage ratio RATIO. A probability distribution of an integrated value of predicted power $\text{PreP}(k)$ to be generated is illustrated using a normal distribution of a standard deviation σ. That is, when an integrated value of the normal distribution is normalized to 1, a value of the normal distribution indicates an occurrence probability of an integrated value of predicted power $\text{PreP}(k)$ to be generated.

As illustrated in FIG. 7, the surplus-amount instantaneous usage-ratio calculator 304 sums first power $P0(k)$. When the electric energy P0 of the power reaches a threshold TH1 corresponding to a value −σ of the confidence interval at a time T1, the surplus-amount instantaneous usage-ratio calculator 304 changes the value of the usage ratio RATIO for a second time period after the time T1 to 0. The usage ratio RATIO for a first time period to the time T1 can be expressed by Equation (10), for example.

$$\text{ratio} = \max\{0, ((TH - P0)/\text{PREP})\} \qquad \text{Equation (10)}$$

In Equation (10), TH1 is the threshold corresponding to −1σ of the confidence interval, P0 is an integrated amount of first power $P0(k)$, PREP is an integrated value of predicted power $\text{PreP}(k)$ to be generated in a demand response time period. That is, PREP is a predicted electric energy to be generated by the renewable energy system 10a in the demand response time period. In this manner, the surplus-amount instantaneous usage-ratio calculator 304 reduces the usage ratio RATIO as the electric energy P0 of the first power $P0(k)$ in the first time period to the time T1 increases. That is, the surplus-amount instantaneous usage-ratio calculator 304 reduces the usage ratio of surplus power $Sp(k)$ with the passage of time. In other words, the surplus-amount instantaneous usage-ratio calculator 304 sets the usage ratio RATIO for the first time period within the demand response time period to a value larger than the usage ratio RATIO for the second time period after the first time period. This can reduce the amount of positive response delay power that may be generated. Further, by reducing the usage ratio RATIO with the passage of time, it can be easier to adjust the integrated amount of second power $G(k)$ in a remaining time period even when positive response delay power is generated.

The probability that an integrated value of predicted power $\text{PreP}(k)$ to be generated reaches the range from −1σ to 1σ is 68.3%. The usage ratio RATIO for the second time period may not be 0 and may be, for example, a fixed value smaller than the minimum value of the usage ratio RATIO for the first time period. In this manner, the surplus-amount instantaneous usage-ratio calculator 304 sets the usage ratio RATIO for a first time period within a predetermined time period such as a demand response time period to a value larger than the usage ratio RATIO for a second time period after the first time period.

According to Equation (2), predicted power $\text{Pre}u(k)$ to be generated has the same probability distribution as that of predicted power $\text{PreP}(k)$ to be generated. That is, a probability distribution of an integrated value of the amount of hydrogen to be produced corresponds to a probability distribution of an integrated value of predicted power $\text{PreP}(k)$ to be generated. For example, an integrated value of produced hydrogen that corresponds to an integrated value of predicted power PreP(k) to be generated is the same as the probability of an integrated value of the predicted power PreP(k) to be generated.

Figure 8:
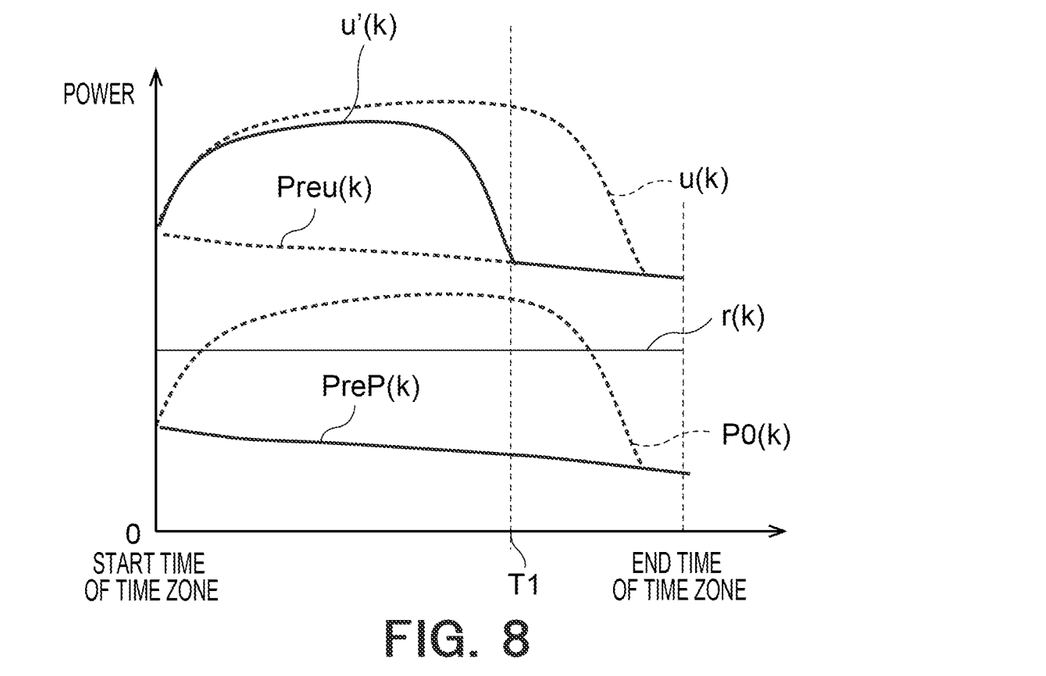
FIG. 8 is a diagram conceptually illustrating power for production that is calculated based on a usage ratio.

FIG. 8 is a diagram conceptually illustrating power u'(k) for production that is calculated based on the usage ratio RATIO illustrated in FIG. 7. As illustrated in FIG. 8, the command value calculator 302 stops using surplus power Sp(k) when the electric energy P0 of first power P0(k) reaches the threshold TH1 at the time T1. Before the electric energy P0 of the first power P0(k) reaches the threshold TH1, the command value calculator 302 reduces the usage ratio RATIO of the surplus power Sp(k) as the electric energy P0 of the first power P0(k) increases.

That is, before the integrated amount of the first power P0(k) reaches the threshold TH1 at the time T1, the command value calculator 302 reduces the amount of surplus power Sp(k) to be actually used for hydrogen production with the passage of time while executing feedback control in such a manner that second power G(k) matches target power r(k) to be received. Therefore, while the amount of positive response delay power that may be generated is reduced, power generated by the renewable energy system 10a can be used for hydrogen production.

On the other hand, after the integrated amount of the first power P0(k) reaches the threshold TH1 at the time T1, power u'(k) for production matches predicted power Preu(k) to be generated and first power p'(k) matches predicted power PreP(k) to be generated as expressed by Equations (8) and (9). Therefore, the second power G(k) matches the target power r(k) to be received as expressed by Equation (11).

$$G(k)=u'k-p'(k)=r(k) \qquad \text{Equation (11)}$$

That is, after the integrated amount of the first power P0(k) reaches the threshold TH1 at the time T1, surplus power Sp(k) is not used for hydrogen production and thus the second power G(k) matches the target power r(k) to be received. Further, when the integrated amount of the second power G(k) in the time period to the time T1 exceeds the integrated amount of the target power r(k) to be received, the integrated amount of the second power G(k) can be adjusted by reducing the power u'(k) for production. Since hydrogen in an amount corresponding to the integrated power amount corresponding to the threshold TH1 ($-\sigma$) is already produced, at least hydrogen in an amount in a range from a target value of the amount of hydrogen to be produced to $-\sigma$ of the confidence interval is secured. The target value of the amount of hydrogen to be produced is the amount of hydrogen that corresponds to a value obtained by summing predicted power Preu(k) to be generated over the demand response time period.

Figure 9:
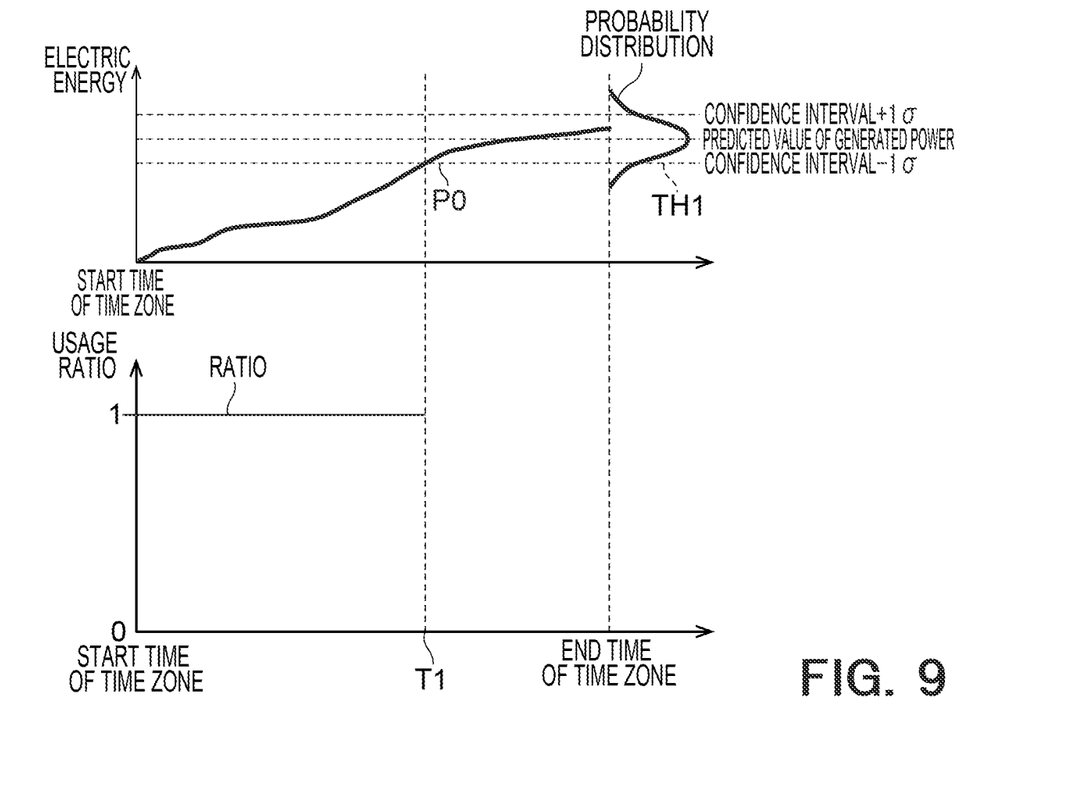
FIG. 9 is a diagram illustrating another example in which a usage ratio is set.

FIG. 9 is a diagram illustrating another example in which the usage ratio RATIO is set. The upper diagram of FIG. 9 illustrates an integrated amount of first power P0(k) of the renewable energy system 10a (FIG. 2). The lower diagram of FIG. 9 illustrates the value of the usage ratio RATIO.

As illustrated in FIG. 9, the surplus-amount instantaneous usage-ratio calculator 304 sets the value of the usage ratio RATIO for the first time period to the time T1 to 1 and sets the value of the usage ratio RATIO for the second time period immediately after the time T1 to 0. In this manner, the surplus-amount instantaneous usage-ratio calculator 304 sets, to 0 or a fixed value, the usage for the second time period after the integrated amount of first power P0(k) reaches the threshold ($-\sigma$) based on a probability distribution of the predicted amount of first power P0(k) to be integrated. In other words, the surplus-amount instantaneous usage-ratio calculator 304 does not change the usage ratio RATIO before the integrated amount of the first power P0(k) reaches the threshold ($-\sigma$) based on the probability distribution of the predicted amount of the first power P0(k) to be integrated. The surplus-amount instantaneous usage-ratio calculator 304 reduces, to 0 or the fixed value, the usage ratio RATIO for the second time period and subsequent time periods after the integrated amount of the first power P0(k) reaches the threshold ($-\sigma$).

The usage ratio RATIO for the second time period may not be 0 and may be, for example, a fixed value smaller than the usage ratio RATIO for the first time period. In this manner, the surplus-amount instantaneous usage-ratio calculator 304 sets the usage ratio RATIO=1 for the first time period within the predetermined time period such as the demand response time period to a value larger than the usage ratio RATIO=0 for the second time period after the first time period. This can reduce the generation of positive response delay power as the time approaches the end of the demand response time period.

Figure 10:
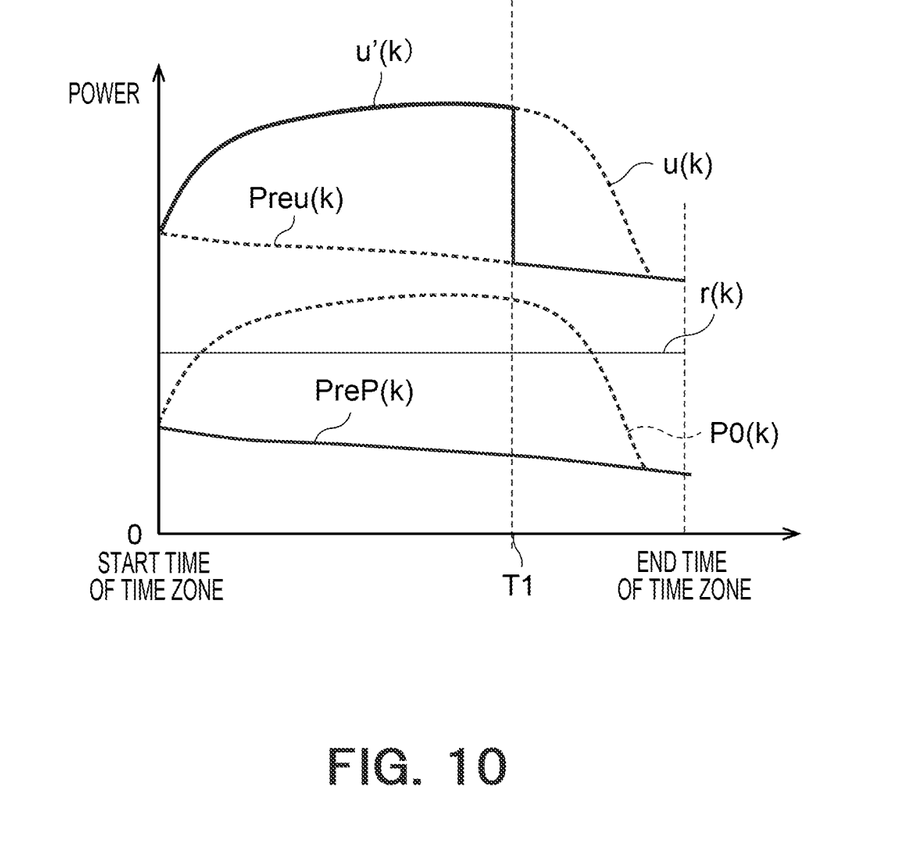
FIG. 10 is a diagram conceptually illustrating power for production that is calculated based on the usage ratio illustrated in FIG. 9.

FIG. 10 is a diagram conceptually illustrating power u'(k) for production that is calculated based on the usage ratio RATIO illustrated in FIG. 9. As illustrated in FIG. 10, when the integrated amount of first power P0(k) reaches the threshold TH1 at the time T1, the command value calculator 302 reduces the amount of surplus power Sp(k) to be used for hydrogen production by the hydrogen production device 10c (FIG. 2).

That is, before the integrated amount of the first power P0(k) reaches the threshold TH1 at the time T1, the command value calculator 302 causes surplus power Sp(k) to be used for hydrogen production in such a manner that second power G(k) matches target power r(k) to be received. Therefore, almost all power generated by the renewable energy system 10a can be used for hydrogen production.

On the other hand, similarly to FIG. 8, after the integrated amount of the first power P0(k) reaches the threshold TH1 at the time T1, surplus power Sp(k) is not used for hydrogen production and thus the second power G(k) matches the target power r(k) to be received. When the integrated amount of the second power G(k) before the time T1 exceeds the integrated amount of the target power r(k) to be received, the amount of second power G(k) to be received can be adjusted by reducing the power u'(k) for production.

While the surplus-amount instantaneous usage-ratio calculator 304 according to the present embodiment sets the time T1 based on the integrated amount of first power P0(k), the time T1 may be set as a fixed value in advance. In this case, even when the integrated amount of first power P0(k) does not reach the threshold TH1, the usage ratio of surplus power Sp(k) can be set to a predetermined value. Therefore, the usage ratio RATIO can be 0 at the end time of a time zone and it can be easier to match the integrated amount of second power G(k) with the target received energy R to be received.

Although the threshold TH1 according to the present embodiment is a fixed value corresponding to $-1\sigma$ of the confidence interval of the amount of generated power but is not limited thereto. For example, when first power P0(k) of the renewable energy system 10a is larger than predicted power PreP(k) to be generated, the threshold TH1 may gradually increase from the value corresponding to $-1\sigma$ of the confidence interval based on the integrated amount of the first power P0(k).

For example, a time period (a time zone for effective use of PV) for which the renewable energy system 10a is effectively used may be set within a demand response time period of 30 minutes, and the value of the threshold TH1 may be increased based on a remaining time period from the time when the integrated power amount P0 reaches the threshold TH1 to the end of the time zone for effective use of PV. Therefore, even when first power P0(k) is larger than predicted power PreP(k) to be generated, the first power P0(k) of the renewable energy system 10a can be more effectively used.

Figure 11:
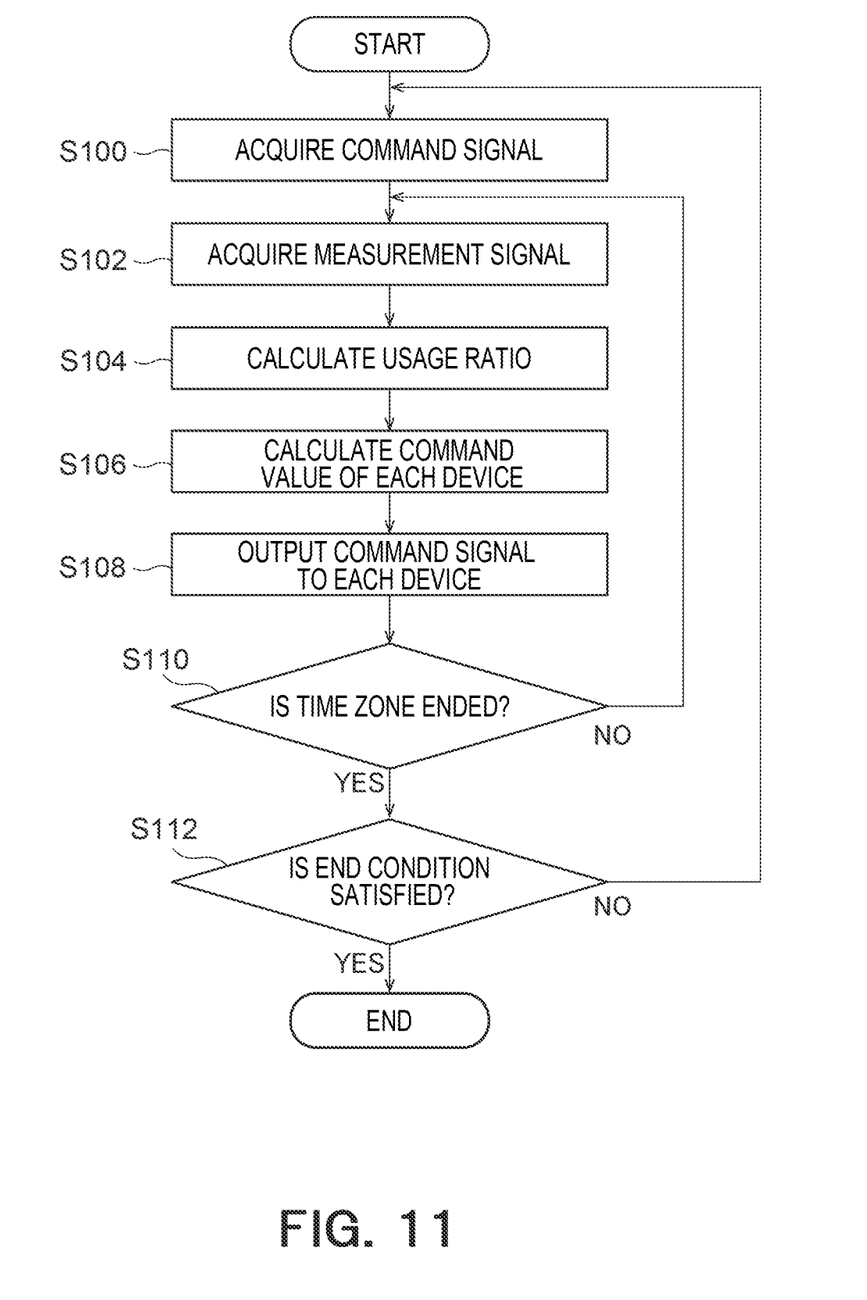
FIG. 11 is a flowchart illustrating an example of control according to the present embodiment.

FIG. 11 is a flowchart illustrating an example of control according to the present embodiment. As illustrated in FIG. 11, first, the interface part 30b acquires a command signal including information of predicted power PreP(k) to be generated, a target received energy R to be received, a confidence interval of a generated power amount, and the like (Step S100). Therefore, the command value calculator 302 calculates target power r(k) to be received by dividing the target received energy R to be received by a demand response time period. Further, the surplus-amount instantaneous usage-ratio calculator 304 sets a threshold TH1 corresponding to a value −σ of the confidence interval.

Next, the interface part 30b receives a measurement signal including information of generated power PW(k) (Step S102).

Next, the surplus-amount instantaneous usage-ratio calculator 304 calculates an integrated value P0 of first power P0(k) by converting the generated power PW(k) into an alternate-current power value and sets the usage ratio RATIO based on the integrated value P0 (Step S104).

Next, the command value calculator 302 calculates power u(k) for production, output power P(k), and second power G(k) and generates a command signal including the power u(k) for production, the output power P(k), and the second power G(k) (Step S106). Subsequently, the output part 306 outputs a command signal including the output power P(k) to the power conditioner 10b and outputs a command signal including the power u(k) for production to the hydrogen production device 10c (Step S108).

Next, the controller 30c determines whether the demand response time period has ended (Step S110). When the demand response time period has not ended (NO at Step S110), the process is repeated from Step S102. On the other hand, when the demand response time period has ended (YES at Step S110), the controller 30c determines whether the entire process is to be ended (Step S112). When the entire process is not to be ended (NO at Step S112), the process is repeated from Step S100. On the other hand, when the entire process is to be ended (YES at Step S112), the controller 30c ends the entire process.

Even when the renewable energy system 10a that is affected by the weather is used and the hydrogen production device 10c that responds to control with a significant delay produces hydrogen as described above, it is possible to realize the target received energy R to be received while producing a target amount of hydrogen. Therefore, even when the renewable energy system 10a generates power in an amount exceeding a predicted value, economical control can be executed by producing an extra amount of hydrogen without reducing the amount of surplus power to be used.

As described above, according to the present embodiment, the hydrogen production device 10c additionally produces hydrogen in an amount corresponding to the usage ratio RATIO of surplus power Sp(k) by which first power p0(k) generated by the renewable energy system 10a exceeds predicted power PreP(k) to be generated. By reducing the usage ratio RATIO with the passage of time in a predetermined time period, the amount of positive response delay power that may be generated can be reduced with the passage of time. Therefore, the integrated amount of second power G(k) to be supplied from the power grid in a predetermined time period can be adjusted to the target received energy R to be received with higher accuracy.

Second Embodiment

The control device 30 according to a second embodiment is different from the control device of the hydrogen system according to the first embodiment in that first control in a demand adjustment time period zone that is a demand response time period is different from second control in a non-demand adjustment time period zone. In the following descriptions, differences from the first embodiment are explained.

Figure 12:
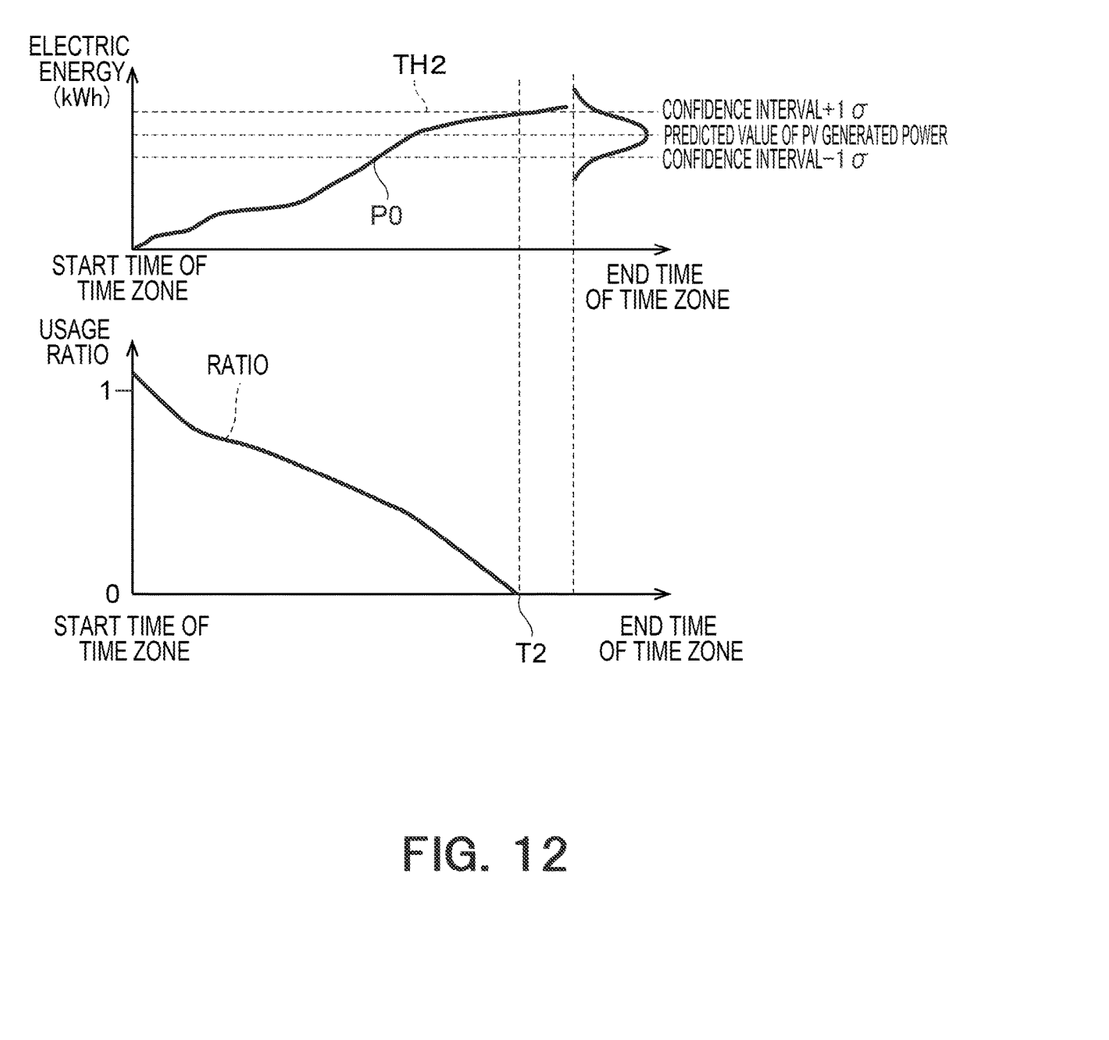
FIG. 12 is a diagram illustrating an example of a method for setting a usage ratio in a non-supply-and-demand adjustment time zone.

FIG. 12 is a diagram illustrating an example of a method for setting the usage ratio RATIO in the non-demand adjustment time period zone. The upper diagram of FIG. 12 illustrates an electric energy P0 of first power P0(k) of the renewable energy system 10a (FIG. 2). The lower diagram of FIG. 12 illustrates the value of the usage ratio RATIO. Further, FIG. 12 illustrates a probability distribution of an integrated value of predicted power PreP(k) to be generated using a normal distribution of a standard deviation σ.

As illustrated in FIG. 12, in the second control in the non-demand adjustment time period zone, when an integrated value P0 of first power P0(k) reaches a threshold TH2 corresponding to a value of +a at a time T2, the surplus-amount instantaneous usage-ratio calculator 304 according to the second embodiment changes the value of the usage ratio RATIO for a second time period after the time T2 to 0. The usage ratio RATIO for a first time period to the time T2 can be expressed by Equation (12).

$$\text{ratio} = \max\{0, ((TH2-P0)/PREP)\} \quad \text{Equation (12)}$$

In Equation (12), TH2 is a generated power amount threshold corresponding to +1σ of the confidence interval, P0 is an integrated amount of first power P0(k), PREP is an integrated value of predicted power PreP(k) to be generated in a demand response time period. Therefore, the usage ratio RATIO according to the present embodiment exceeds 1.0.

As described above, Equation (12) is different from Equation (10) in that the threshold TH2 is used in Equation (12). In the non-demand adjustment time period zone, it is more important to match a target value of the amount of hydrogen to be produced than to match the target received energy R to be received. Therefore, the amount of received power increases due to a delay in positive control response, but first power P0(k) of the renewable energy system 10a (FIG. 2) is more effectively used as illustrated in FIG. 12. The surplus-amount instantaneous usage-ratio calculator 304 according to the present embodiment uses the threshold TH1 corresponding to −1σ of the confidence interval in the demand adjustment time period zone and uses the threshold TH2 corresponding to +1σ of the confidence interval in the non-demand adjustment time period zone, but it is not limited thereto. For example, a value smaller than the predicted value PREP of the electric energy to be generated may be set to a threshold in the demand adjustment time period zone, and a value larger than the predicted value PREP of the electric energy to be generated may be set to a threshold in the non-demand adjustment time period zone.

Figure 13:
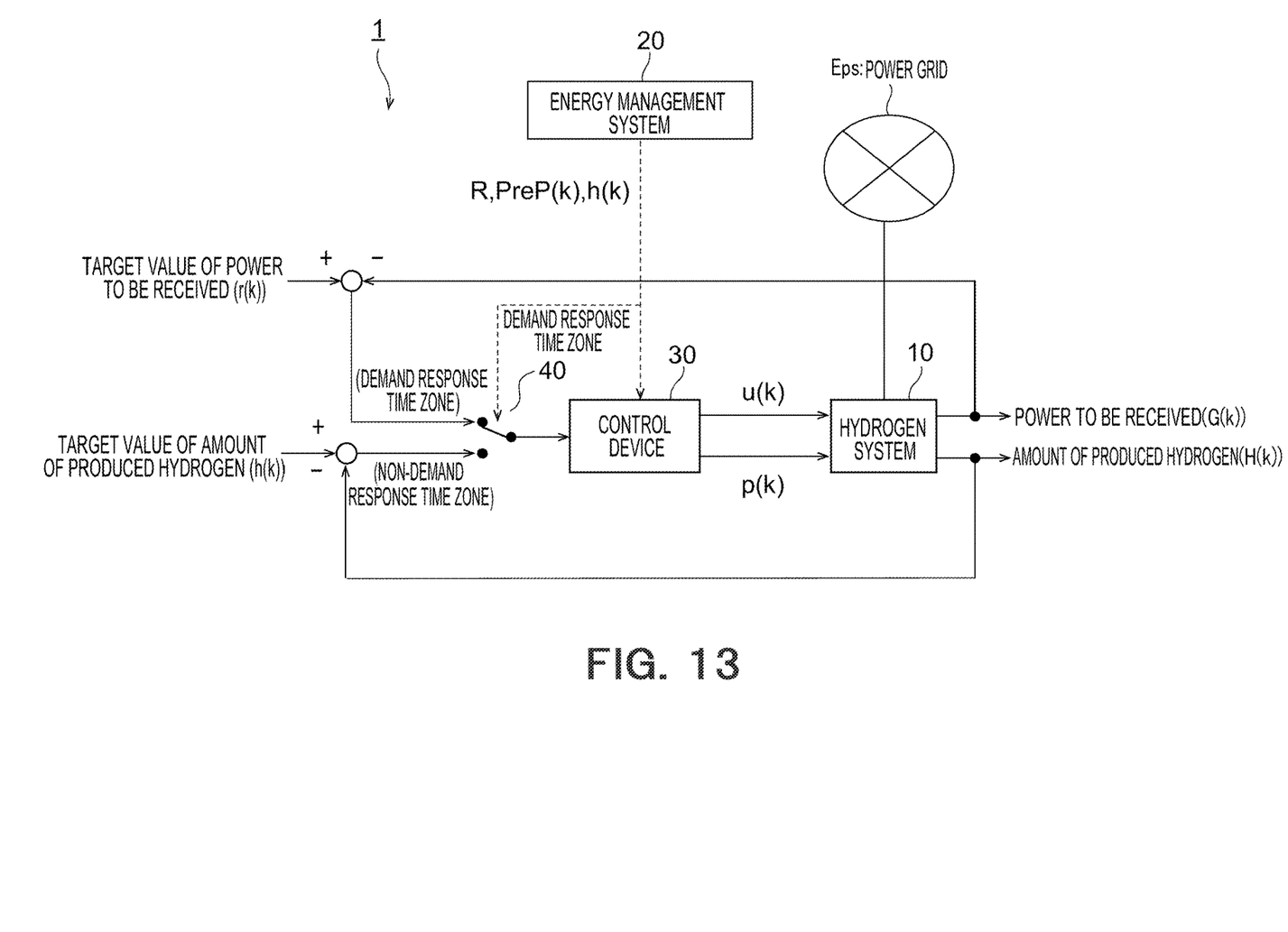
FIG. 13 is a block diagram of a hydrogen production system according to a second embodiment.

FIG. 13 is a block diagram of a hydrogen production system according to the second embodiment. The hydrogen production system 1 according to the second embodiment is different from the hydrogen production system 1 according to the first embodiment in that the hydrogen production system 1 according to the second embodiment further includes a switching part 40. As illustrated in FIG. 13, the energy management system 20 outputs, to the control part 30 and the switching part 40, a command signal including a target hydrogen production value h(k) and a Demand response time zone that is a demand adjustment time period zone.

The switching part 40 switches a switch to a Demand response time zone side in the Demand response time zone and to a non-Demand response time zone side in the other time zone based on the command signal including the Demand response time zone. Therefore, in the Demand response time zone, the control device 30 executes feedback control to match second power G(k) with target power r(k) to be received. On the other hand, in the non-Demand response time zone, the control device 30 executes feedback control to match the amount H(k) of hydrogen with the target hydrogen production value h(k). When inverse flow of power from the hydrogen system 10 to the power grid Eps is prohibited, the hydrogen system 10 may adjust the received energy to a fixed amount.

As described above, according to the present embodiment, since the amount of hydrogen to be produced matches the target value in the non-Demand response time zone, hydrogen can be produced using a larger amount of first power P0($k$) of the renewable energy system 10a. Further, the surplus-amount instantaneous usage-ratio calculator 304 can use the threshold TH2 corresponding to +1σ of the confidence interval to enable hydrogen to be produced using a larger amount of first power P0($k$) of the renewable energy system 10a than that in the case where the threshold TH1 is used.

Third Embodiment

The control device 30 according to a third embodiment is different from the control device of the hydrogen system according to the first embodiment in that the control device 30 according to the third embodiment further includes an administrator setter 30d. In the following descriptions, differences from the first embodiment are explained.

Figure 14:
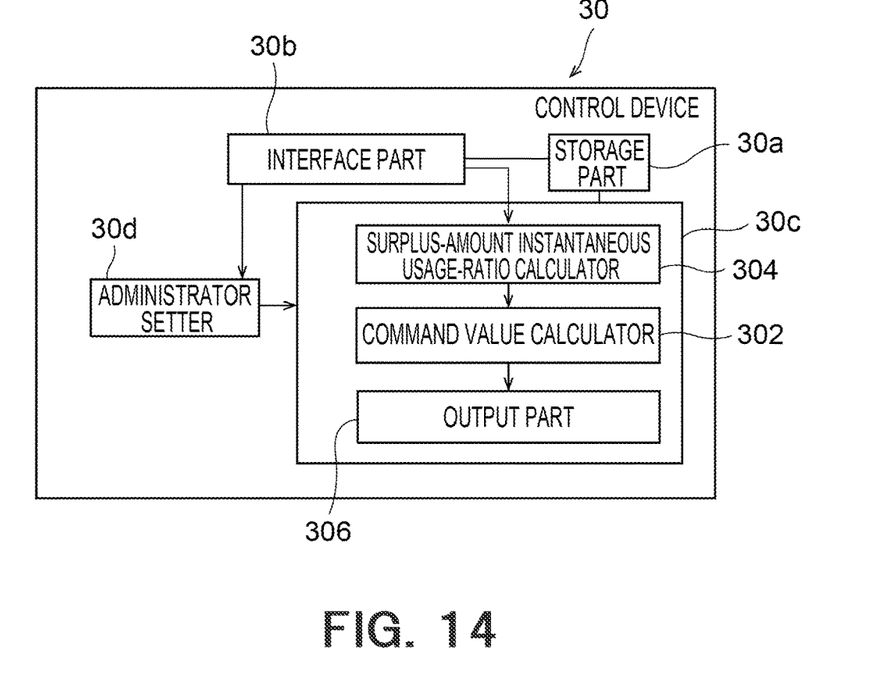
FIG. 14 is a block diagram of a control device according to a third embodiment.

FIG. 14 is a block diagram of the control device 30 according to the third embodiment. As illustrated in FIG. 14, the administrator setter 30d is used by an administrator to set a threshold TH3 in the surplus-amount instantaneous usage-ratio calculator 304. The administrator setter 30d according to the present embodiment corresponds to a setter.

The surplus-amount instantaneous usage-ratio calculator 304 uses the threshold TH3 set by the administrator setter 30d to calculate the usage ratio RATIO according to Equation (13), where P0 is an integrated amount of first power P0($k$) and PREP is an integrated value of predicted power PreP(k) to be generated in a demand response time period.

$$\text{ratio}=\max\{0,((TH3-P0)/\text{PREP})\} \quad \text{Equation (13)}$$

As described above, according to the present embodiment, since the administrator sets the threshold TH3 for the usage ratio RATIO, experience and know-how of the administrator can be taken into account.

Fourth Embodiment

The control device 30 according to a fourth embodiment is different from the control device 30 of the hydrogen system according to the first embodiment in that the control device 30 according to the fourth embodiment further includes a renewable-energy change amount predictor 30e. In the following descriptions, differences from the first embodiment are explained.

Figure 15:
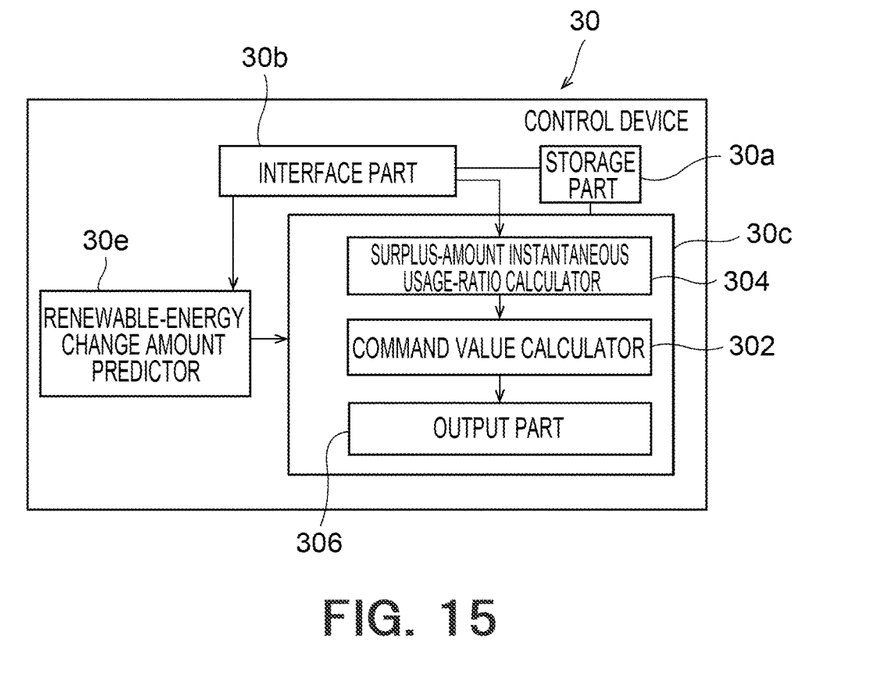
FIG. 15 is a block diagram of a control device according to a fourth embodiment.

FIG. 15 is a block diagram of the control device 30 according to the fourth embodiment. As illustrated in FIG. 15, the renewable-energy change amount predictor 30e uses predicted power PreP(k) to be generated, a confidence interval of a generated power amount, a predicted temperature value T(k), generated power P(k), and a current value V(k) of a wind velocity to predict an amount of change in an amount P0 of first power of the renewable energy system 10a in one control time period, for example, in each time period of 30 minutes. The amount of change may be an evaluation value indicated by any of 10 different discrete values or continuous values, or may be represented by any of large, middle, and small, or the like.

As a method for predicting the amount of change, a generally known method is used. For example, a regression model is generated to predict the amount of change. Alternatively, a clustering method such as a decision tree or k-means clustering may be used to predict the amount of change.

The surplus-amount instantaneous usage-ratio calculator 304 changes TH1 of Equation (10) to TH4(X) that varies depending on an amount X of change in a first power amount PREP that is to be generated and has been predicted by the renewable-energy change amount predictor 30e. In this case, the usage ratio RATIO is expressed by, for example, Equation (14), where P0 is an integrated amount of first power P0($k$), and PREP is an integrated amount of predicted power PreP(k) to be generated in the demand response time period. The amount X of change is, for example, a of a probability distribution of an integrated value of predicted power PreP(k) to be generated in the demand response time period.

$$\text{ratio}=\max\{0,((TH4(X)-P0)/R)\} \quad \text{Equation (14)}$$

When the amount X of change in first power P0($k$) to be generated by the renewable energy system 10a is predicted to be large, the threshold TH4(X) indicates a smaller value. For example, the threshold TH4(X) is a monotonous decrease function of the amount X of change.

As described above, according to the present embodiment, the threshold TH4(X) for the usage ratio RATIO is the monotonous decrease function of the amount X of change. Therefore, the target value R of the received energy is easily realized. When the amount X of change is predicted to be small, TH4(X) is increased to enable first power P0($k$) generated by the renewable energy system 10a to be more effectively used.

While certain embodiments have been described, these embodiments have been presented by way of example only, and are not intended to limit the scope of the inventions. The novel apparatus, method, and program described in the present specification may be embodied in a variety of other forms. Further, with regard to the forms of the apparatus, method, and program described in the present specification, various omissions, substitutions, and changes may be made without departing from the spirit of the inventions.

The invention claimed is:

1. A hydrogen-system control device that controls a hydrogen system that produces hydrogen using first power generated by a renewable energy system and second power supplied from a power grid, the device comprising:
an acquirer configured to acquire a predicted value of the first power for a time period for which an amount of the second power to be received has been set; and a controller configured to cause the hydrogen system to additionally produce hydrogen in an amount corresponding to a usage ratio of surplus power by which a supplied value of the first power exceeds the predicted value of the first power, wherein the controller is configured to set the usage ratio for a first time period within the time period to a value larger than the usage ratio for a second time period that is after the first time period and within the time period.

2. The device of claim 1, wherein the controller is configured to set the usage ratio for the second time period to 0 or a fixed value.

3. The device of claim 1, wherein the controller is configured to reduce the usage ratio as an integrated amount of the first power in the first time period increases.

4. The device of claim 1, wherein the controller is configured to reduce the usage ratio in the first time period with passage of time.

5. The device of claim 1, wherein the controller is configured to set, to 0 or a fixed value, the usage ratio after a time when an integrated amount of the first power in the time period reaches a threshold based on a probability distribution of a predicted amount of the first power to be integrated in the time period.

6. The device of claim 5, wherein the controller is configured to increase the threshold with passage of time after the integrated amount of the first power in the time period reaches the threshold, and to cause the hydrogen system to additionally produce hydrogen in an amount corresponding to a value obtained by multiplying the usage ratio by the surplus power.

7. The device of claim 5, wherein the controller is configured to set a first threshold smaller than a predicted amount of the first power to be integrated in the time period, when an amount of the second power to be received is set, and the controller is configured to set a second threshold larger than the predicted amount of the first power to be integrated in the time period, when the amount of the second power to be received is not set.

8. The device of claim 5, wherein the controller changes the threshold based on an amount of change in a predicted electric energy to be generated by the renewable energy system.

9. The device of claim 1, wherein the controller is configured not to change the usage ratio until an integrated amount of the first power in the time period reaches a threshold based on a probability distribution of a predicted amount of the first power to be integrated in the time period, and to reduce, to 0 or a fixed value, the usage ratio after the integrated amount of the first power in the time period reaches the threshold.

10. The device of claim 1, further comprising a setter configured to set a threshold in accordance with an operation of an operator, wherein the controller is configured to set, to 0 or a fixed value, the usage ratio after an integrated amount of the first power in the time period reaches the threshold set by the setter.

11. The device of claim 1, wherein controller includes a usage calculator configured to calculate the usage ratio based on a threshold based on a probability distribution of a predicted amount of the first power to be integrated in the time period, a command value calculator configured to calculate, based on the usage ratio, a command value to a hydrogen production device and a power conditioner that are included in the hydrogen system, and an output part configured to output the command value to the hydrogen production device and the power conditioner.

12. A hydrogen-system controlling method for producing hydrogen using first power generated by a renewable energy system and second power supplied from a power grid, the method comprising:

an acquisition process of acquiring a predicted value of the first power for a time period for which an amount of the second power to be received has been set; and a control process of causing the hydrogen system to additionally produce hydrogen in an amount corresponding to a usage ratio of surplus power by which a supplied value of the first power exceeds a predicted value of the first power, wherein the control process sets the usage ratio for a first time period within the time period to a value larger than the usage ratio for a second time period that is after the first time period and within the time period.

* * * * *